United States Patent [19]

Iba et al.

[11] Patent Number: 4,974,140
[45] Date of Patent: Nov. 27, 1990

[54] VOLTAGE STABILITY DISCRIMINATION SYSTEM FOR POWER SYSTEMS

[75] Inventors: Kenji Iba, Hyogo; Hiroshi Suzuki, Tokyo, both of Japan

[73] Assignee: Mitsubishi Denki Kabushiki Kaisha, Tokyo, Japan

[21] Appl. No.: 423,982

[22] Filed: Oct. 19, 1989

[30] Foreign Application Priority Data

Feb. 1, 1989 [JP] Japan ................................ 1-20812

[51] Int. Cl.$^5$ .............................................. H02J 3/00
[52] U.S. Cl. ........................................ 363/74; 363/78; 323/234; 307/31; 364/492; 364/495
[58] Field of Search ................... 363/74, 78; 323/205, 323/212, 234, 241, 283, 299, 318, 322, 349; 307/31, 52; 364/492, 495

[56] References Cited

U.S. PATENT DOCUMENTS

| | | | |
|---|---|---|---|
| 3,863,270 | 1/1975 | Haley et al. | 364/492 |
| 3,883,724 | 5/1975 | Pradhan et al. | 307/31 |
| 4,017,790 | 4/1977 | Friedlander | 323/206 |
| 4,135,128 | 1/1979 | Kelley, Jr. | 323/210 |
| 4,272,692 | 6/1981 | Morse | 323/349 |
| 4,779,036 | 10/1988 | Shinoda | 323/236 |

OTHER PUBLICATIONS

Tamura et al., "A Method for Finding Multiple Load--Flow Solutions for General Power Systems", IEEE paper No. A80 043-0, Presented at IEEE PES Winter Meeting, New York, N.Y., Feb. 3-8, 1980, pp. 1-9.
Iwamoto et al., "A Load Flow Calculation Method for Ill-Conditioned Power Systems", IEEE Transactions on Power Apparatus and Systems, vol. PAS-100, No. 4, Apr. 1981, pp. 1736-1741.

Primary Examiner—Peter S. Wong
Attorney, Agent, or Firm—Bernard, Rothwell & Brown

[57] ABSTRACT

A voltage stability discriminating system for a power system is disclosed for calculating a multiple load flow solution relating to a voltage stability discrimination for a power system in which the voltage stability can be discriminated fast and accurately due to the fact that the voltage stability discrimination system of the power system is constructed such that the multiple load flow solution is estimated in advance during a calculation process of the load flow calculating means. For example, the load flow calculation is made through the N-R method of a rectangular coordinates system, and after the first solution is converged and the first load flow solution (an output value of the load flow calculation means) is determined, the estimated value of the above-mentioned multiple load flow solution is examined by the load flow solution determining means so as to determine the first load flow solution as the load flow solution, or the estimated value of the above-mentioned multiple load flow solution is applied and the load flow solution is determined by performing the load flow calculation.

2 Claims, 2 Drawing Sheets

V : VOLTAGE
P : LOAD OR TOTAL DEMAND

VOLTAGE STABILITY DISCRIMINATION SYSTEM FOR POWER SYSTEMS

BACKGROUND OF THE INVENTION

1. Field of the Invention

This invention relates to a voltage stability discrimination system for a power system for use in calculating a pair of multiple load flow solutions which are closely located each other concerning the voltage stability discrimination for the power system.

2. Description of the Prior Art

As recent power systems have become large and complicated, it is sometimes found that a limitation on the system's stability may be determined by a voltage stability as well as a dynamic stability of power generators. FIG. 1 is a load-voltage curve (hereinafter called a P-V curve), wherein if the power system has characteristics as shown by a curve A and the load is set at $P_1$, the two load flow solutions become $A_1$ and $A_2$. The fact that $A_1$ and $A_2$ are adjacent to each other as shown in this diagram means that the Power $P_A$ is the stability limit and beyond this Point voltage collapse may occur. In turn, in the curve B, the two load flow solutions are $B_1$ and $B_2$. (The solution $B_2$ is not present in a certain case.) Since the solutions $B_1$ and $B_2$ are located apart as compared with those shown in the curve A, they are far from representing a stability limit in transmitting power $P_B$ where the voltage collapse starts to occur and they have a voltage stability. In view of this fact, although the voltage stability has a close relation with a pair of multiple load flow solutions and some researchers have investigated for a method of resolving multiple solutions so as to get some effects, it is desired to make a robust and fast calculating method for finding a multiple load flow solution (a lower solution) which locates nearby a normal operating voltage solution (a higher solution) because such a solution may have a bad influence on the voltage stability.

In view of the foregoing, applicants will describe a method of finding a pair of load flow solutions in the prior art voltage stability discrimination system for the power system indicated in "A method for Finding Multiple Load-Flow Solutions for General Power Systems" by Tamura, Iba and Iwamoto, IEEE paper No. A80 043-0 presented at the IEEE PES Winter Meeting, New York, N.Y., February 3-8, 1980.

A current basic equation of a P-th bus line in n-th bus line system can be expressed as follows by applying rectangular coordinates.

$$P_p = \sum_{q-1}^{n} (G_{pq}e_p e_q + B_{pq}e_p f_q - B_{pq}f_p e_q + G_{pq}f_p f_q) \quad (1)$$

$$Q_p = \sum_{q-1}^{n} (B_{pq}e_p e_q - G_{pq}e_p f_q + G_{pq}f_p e_q + B_{pq}f_p f_q) \quad (2)$$

$$|V_p|^2 = e_p^2 + f_p^2 \quad (3)$$

where, $$\begin{cases} Y_{pq} = G_{pq} - jB_{pq}: & \text{Admittance} \\ S_p = P_p - jQ_p: & \text{Injected Power} \\ V_p = e_p + jf_p: & \text{Bus Voltage} \end{cases}$$

Then, the first and second equations are rewritten to the following equations (4) and (5):

$$P_p = G_{pp}(e_p^2 + f_p^2) + A_p e_p + B_p f_p \quad (4)$$

$$Q_p = B_{pp}(e_p^2 + f_p^2) - B_p e_p + A_p f_p \quad (5)$$

provided that $$\begin{cases} A_p = \sum_{q \neq p}^{n} (e_q G_{pq} + f_q B_{pq}) \\ B_p = \sum_{q \neq p}^{n} (f_q G_{pq} + e_q B_{pq}) \end{cases}$$

Further, the values of $A_p$ and $B_p$ are assumed to be fixed and they are rewritten into a standard form of a circle as follows:

$$\left( \sqrt{\frac{P_p}{G_{pp}} + \frac{A_p^2 + B_p^2}{4G_{pp}^2}} \right)^2 = \quad (6)$$

$$\left( e_p + \frac{A_p}{2G_{pp}} \right)^2 + \left( f_p + \frac{B_p}{2G_{pp}} \right)^2$$

$$\left( \sqrt{\frac{Q_p}{B_{pp}} + \frac{A_p^2 + B_p^2}{4B_{pp}^2}} \right)^2 = \quad (7)$$

$$\left( e_q - \frac{B_p}{2B_{pp}} \right)^2 + \left( f_p + \frac{A_p}{2B_{pp}} \right)^2$$

and then solutions of the above-mentioned simultaneous equations (6) and (7) are obtained In the prior art system, such local information above has been applied and a plurality of initial values for the multiple load flow solution calculation means have been prepared. Multiple load flow solutions have then been determined under several repetitions of calculation.

A voltage collapse suddenly occurs even if a severe contingency does not occur, and once the voltage collapse starts to continue, the conventional voltage controlling procedure may be not just scarcely effective, but rather it shows an inverse effect Due to this fact, it was necessary to get a fast and accurate calculation of a pair of multiple load flow solutions, a discrimination of a voltage stability, and fast control actions to generators, load shedding and lock of automatic adjustment control of transformers. However, the calculation of multiple load flow solutions in the voltage stability discrimination system in the prior art power system had to generate several initial values and repeat the conventional load flow calculation under a trial and error basis In general, there was a problem that the previous method required a lot of computing time to find multiple load flow solutions.

SUMMARY OF THE INVENTION

This invention sets forth to eliminate the above-mentioned problems and has as its object to provide a voltage stability discrimination system for a power system for determining a pair of load flow solutions which have parameters close to each other fewer calculations and is capable of discriminating a voltage stability fast and accurately.

The method of finding a pair of multiple load flow solutions in the present invention is based on the following observations and mathematical backgrounds.

1. Conventional Newton-Raphson method in rectangular coordinates has a remarkable convergent characteristic that tends to converge straight along the line A-B (where A and B represent the two pair of solutions).

2. An optimal multiplier method described in "A Load Flow Calculation Method for Ill-Conditioned Power Systems", (by Iwamoto and Tamura, IEEE PAS-100 pp 1736-1742 April 1981) can be applied to obtain the three real root of the multiplier. Using the three real root of the multiplier, multiple load flow solution can be solved easily.

A brief flow-chart of the method is as follows.

(1.) Start load flow calculation by the conventional Newton-Raphson method in rectangular coordinates from an initial condition (e.g. flat start).

(2.) Calculate the optimal multipliers in every iterative process. If three real roots ($\mu 1 < 2 < \mu 3$) are obtained, estimate solution B using equation (8). Then store the latest estimated value.

$$Xo = Xe + \mu^3 \Delta X \tag{8}$$

(3.) Continue iteration and obtain the first solution A.

(4.) Examine Xo as to whether it can be an exact solution. If inequality (9) is satisfied, estimated value Xo can be the other solution B itself. Otherwise, proceed to the next step is represented by:

$$\epsilon m = \max_i |Ys_i - Y_i(x)| < \epsilon \text{ for } i = 1, 2 \ldots 2(n-1) \tag{9}$$

where
$\epsilon$: tolerance of load flow
$\epsilon m$: maximum error (mismatch)
n: number of buses.

(5.) Start the second load flow calculation by setting the initial condition to Xo. Then obtain solution B.

The above and other objects as well as some other features of the present invention will become more apparent by the following detailed description made in reference to the accompanying drawings. The accompanying drawings are illustrative only and do not limit the scope of the present invention.

DETAILED DESCRIPTION OF THE PREFERRED EMBODIMENTS

Figure 1:
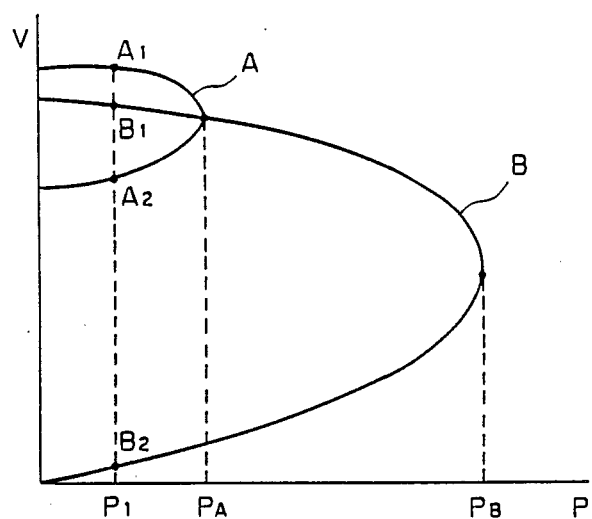
FIG. 1 is an illustrative diagram for showing a P-V curve indicating a voltage stability.
Figure 2:
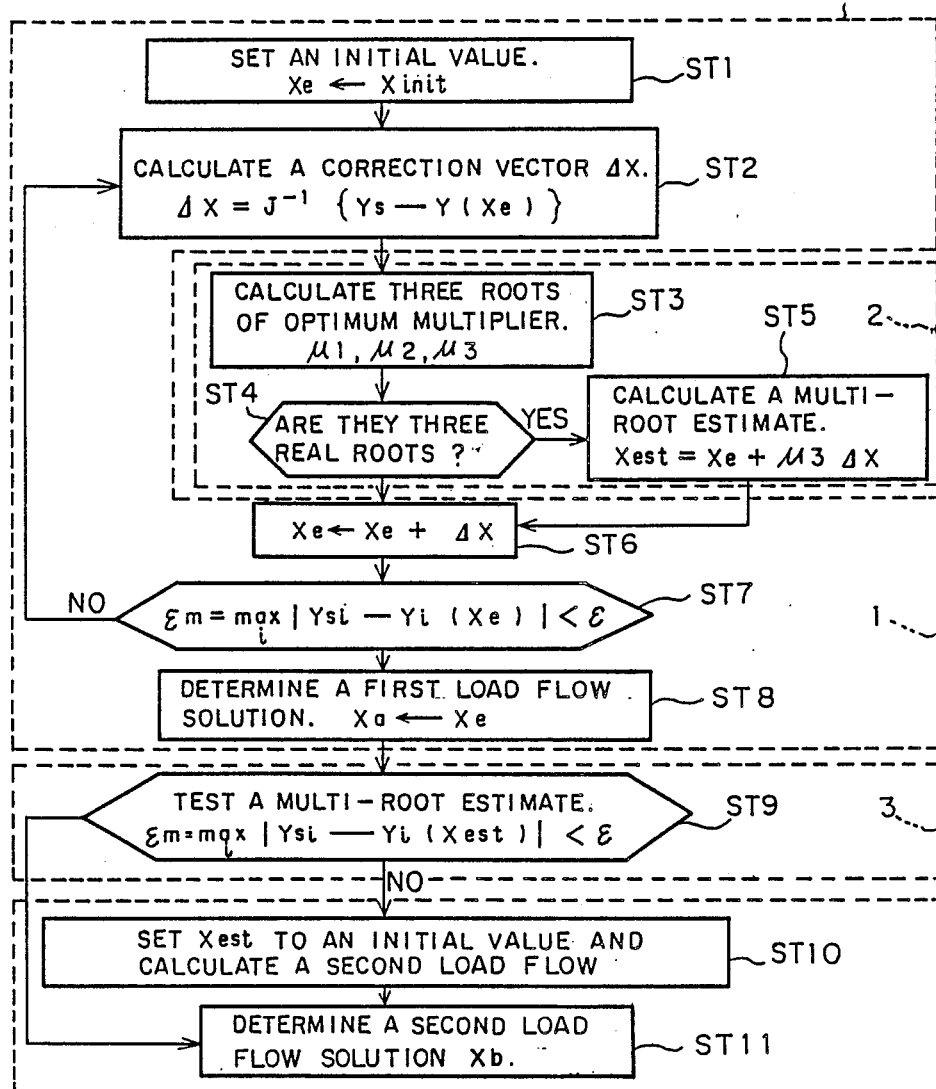
FIG. 2 is a flow chart for illustrating a method of finding a pair of multiple load flow solutions according to one preferred embodiment of the present invention.

Referring now to the flow chart of FIG. 2, one preferred embodiment of the method of finding a pair of multiple load flow solutions of the present invention will be described. In this figure, the step ST1 is an initial value setting routine, the step ST2 is a calculating part for a correction vector $\Delta X$, the step ST3 is a calculation part for an optimal multiplier, the step ST4 is a discrimination part for judging whether or not the obtained optimal multiplier becomes three real roots or one real root and two imaginary roots or not, the step ST5 is an estimated value of a multiple load flow solution calculating part, and the step ST6 is a correcting part for a solution which is same as the prior art load flow calculating process.

The step ST7 is a converging discrimination part for a load flow calculation, the step ST8 is a memory holding part for the first load flow solution, the step ST9 is an examination part for examining whether the multi-root estimated value of the second load flow solution calculated at the step ST5 may be one of the solutions, and the step ST10 is the second load; flow calculation part with the estimated value of the second load flow solution being an initial value. A result of the calculation of the step ST10 is stored and held as the second load flow solution of the step ST11.

In this figure, reference numeral 1 denotes an operation performed by a load flow calculating means, 2 an operation performed through an optimal multiplier calculating means, and 3 an operation performed by a power flow solution determining means.

An operation at each of the steps will be described hereinafter.

An initial value is set in the same manner as that of the general current calculation (step ST1). For example, it is sufficient to set an initial value called as a flat start (Xinit: an initial value). In the step ST2, the correction vector $\Delta X$ is calculated. Subsequently, a calculation for getting three roots of the optimum multipliers $\mu^1$, $\mu^2$ and $\mu^3$ in the step ST3 will be described later.

At first, assuming that Ys is a specified value and X is a bus voltage, and load flow equation can be expressed as $$Ys = Y(X) \tag{10}$$

and further assuming that Xe is a voltage estimated value, this equation can be expressed as follows by using a Jacobian matrix J, $$Ys = Y(Xe) + J\Delta X + Y(\Delta X) \tag{11}$$

After the correction vector $\Delta X$ is calculated by a general N-R method ignoring the third term of the equation (11), the correction vector is multiplied by a scalar multiplier and then an objective function of equation (12) is minimized.

$$F = \| Ys - Y(Xe) - \mu J \Delta X + \mu^2 Y(\Delta X) \|^2 \tag{12}$$

The optimal for minimizing the equation (12) can be attained by resolving the cubic equation of the equation (11).

$$\frac{\partial F}{\partial \mu} = g_3 \cdot \mu^3 + g_2 \cdot \mu^2 + g_1 \cdot \mu + g_0 = 0 \quad (13)$$

The root of the equation (13) may become in general three real roots or one real root and two imaginary roots. In the step ST4, it is discriminated whether the three roots are three real roots or one real root and two imaginary roots or not. Only in case the root is three real roots, the maximum root of the three roots is applied to calculate an estimated value (Xest) of a multiple load flow solution in the step ST5. As regards converging characteristics, if the first load flow calculation is quite the same as the normal load flow calculation. After this calculation, it is examined if the multi-root estimated value (Xest) calculated and stored in the step ST5 might be an exact solution by itself or not. If the estimated value (Xest) is the second solution, the estimated value (Xest) is the second load flow solution (a final load flow solution) Xb and then the calculation is completed there (step ST11).

If its error is large, the estimated value is returned to the initial value and the second load flow calculation is carried out (a step ST10). The obtained solution becomes the second load flow solution Xb.

In the above-mentioned preferred embodiment, a method for determining the multiple load flow solutions having a high accuracy has been described. However, the second load flow calculation at the step ST10 shown in FIG. 2 could be omitted. Although its accuracy is deteriorated a little, it is practically applicable even if the multi-root estimated value is treated as a second load flow solution (a final load flow solution). In addition, also in regard to the calculation of the optimal multiplier at the step ST3 in FIG. 2, the fact that the three real roots may not be obtained is examined by a certain method, thereby it is also possible to eliminate or save a troublesome means for calculating an imaginary root.

As described above, the present invention enables a voltage stability to be judged quickly accurately due to the following facts:

1. The presented voltage stability discrimination system is constructed with traditional N-R method and an additional subprocess making it is easy to apply and install.

2. The subprocess, which utilizes an optimal multiplier method, can solve or estimate a multiple load flow solution. The computing time required for this subprocess is revolutionally fast as compared with the state of art.

3. The obtained second solution (i.e. a multiple load flow solution) can yield valuable information for voltage stability.

What is claimed is:

1. A voltage stability discriminating system for a power system for determining a multiple load flow solution for the power system with a multiple load flow solution calculating means and discriminating a voltage stability characterized in that said multiple load flow solution calculating means comprises a load flow calculating means for carrying out a load flow calculation and an optimal multiplier calculating means for calculating an estimated value of the multiple load flow solution in response to an intermediate output value of said load flow calculating means, the estimated value of said multiple load flow solution is inspected based on the output value of said load flow calculating means to determine the load flow solution.

2. A voltage stability discriminating system for a power system as set forth in claim 1, wherein the estimated value of said multiple load flow solution is applied as an initial value to the load flow solution determining means for outputting the estimated value to said load flow calculating means.

* * * * *

UNITED STATES PATENT AND TRADEMARK OFFICE
CERTIFICATE OF CORRECTION

PATENT NO. : 4,974,140

DATED : November 27, 1990

INVENTOR(S) : Kenji Iba et al

It is certified that error appears in the above-identified patent and that said Letters Patent is hereby corrected as shown below:

Col. 1, line 11, after "located" insert --to--;

line 54, after "in" insert --a--.

Col. 2, line 11, "$A_{pcp} + B_{pfp}$" should be --$A_p e_p + B_p f_p$--;
line 13, "$B_{pep} + A_{pfp}$" should be --$B_p e_p + A_p f_p$--;
line 21, "$(fqG_{pq} + eqB_{pq})$" should be --$(f_q G_{pq} + e_q B_{pq})$--;
line 43, "$e_q$" should be --$e_p$--;
line 46, after "obtained" insert --.--;
line 56, "shows" should be --results on--;
same line, after "effect" insert --.--.
line 65, after "basis" insert --.--.

Col. 3, line 7, after "other" insert --with--;
line 26, delete the paragraph indent;
line 28, "(1.)" should be --1.)--;
line 31, "(2.)" should be --2.)--;
line 32, "($\mu1<2<\mu3$)" should be --($\mu1<\mu2<\mu3$)--;
line 38, "(3.)" should be --3.)--;
line 39, "(4.)" should be --4.)--;
line 42, after "step" insert --. Inequality (9)--;
line 46, "$Y_i(x)$" should be --$Y_i(X)$--;
line 53, "(5.)" should be --5.)--.

UNITED STATES PATENT AND TRADEMARK OFFICE
CERTIFICATE OF CORRECTION

PATENT NO.  :   4,974,140
DATED       :   November 27, 1990
INVENTOR(S) :   KENJI IBA ET AL.

It is certified that error appears in the above-identified patent and that said Letters Patent is hereby corrected as shown below:

Col. 4,  line 14, delete "or not";
         line 25, delete ";";
         line 61, after "multiplier" insert --μ--;
         line 66, after "optimal" insert --μ--.

Col. 5, line 30, "$ST^{10}$" should be --ST10--.

Col. 6, line 4, after "quickly" insert --and--.

Signed and Sealed this

Eleventh Day of August, 1992

*Attest:*

DOUGLAS B. COMER

*Attesting Officer*     *Acting Commissioner of Patents and Trademarks*